July 25, 1939. T. E. LLOYD 2,167,120
PROCESS OF CALCINING FINELY DIVIDED CALCIUM CARBONATE
Filed Sept. 3, 1938
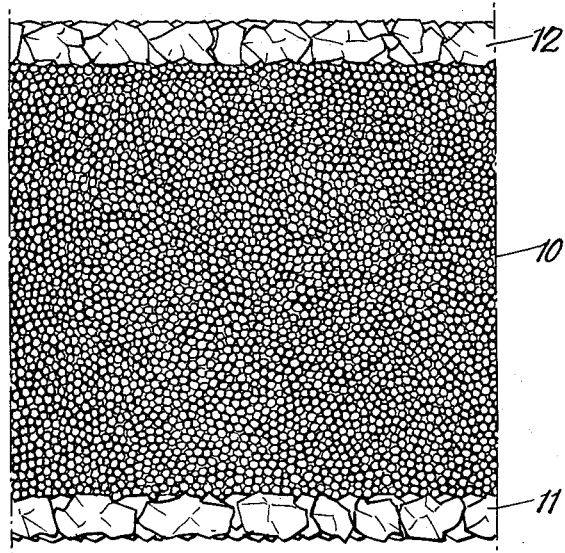
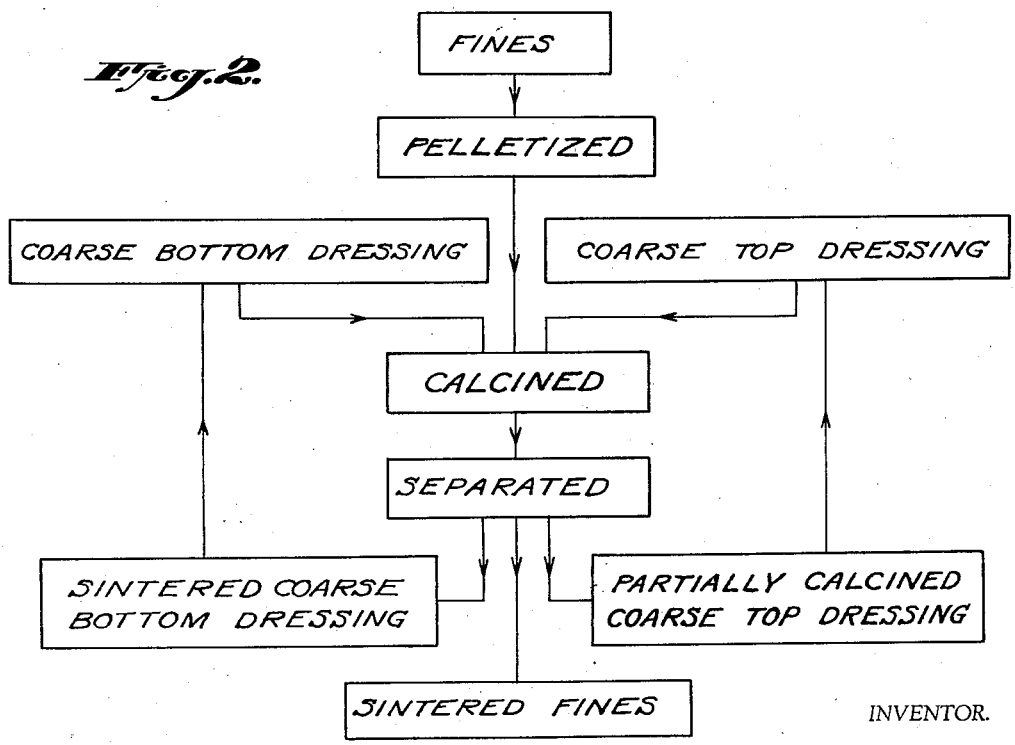
INVENTOR.
THORNE E. LLOYD.
BY
Benj. T. Rauber ATTORNEY.

Patented July 25, 1939

2,167,120

UNITED STATES PATENT OFFICE 2,167,120

PROCESS OF CALCINING FINELY DIVIDED CALCIUM CARBONATE

Thorne E. Lloyd, Netcong, N. J., assignor to Dwight & Lloyd Metallurgical Company, New York, N. Y., a corporation of New Jersey Application September 3, 1938, Serial No. 228,285

8 Claims. (Cl. 263—53)

My invention relates to a process of calcining calcium carbonate or other alkali earth carbonates in a finely divided condition such as that resulting from the precipitation of calcium carbonate in chemical processes or natural fine limestone marls, finely crushed limestone such as flotation products, and in general to materials ranging down in particle size from about 80 mesh.

Heretofore limestone has generally been calcined to lime in shaft furnaces in which the stone is placed with the fuel and heated with an up-draft of air. This method of calcining limestone is, however, applicable only to the stone occurring in large pieces or aggregates. It cannot be applied to thin finely divided carbonates, such as those to which the present invention is directed, because such materials would pack too tightly to permit a draft upwardly through a stack furnace and would be blown out of the furnace if sufficient draft could be created to carry on the calcining operation.

In the process of my present invention, the finely divided carbonates are calcined on a calcining machine. These machines are constructed with a grate, generally a travelling grate, upon which the material is carried in a bed or layer of relatively small thickness, generally between 5" and 8". Hot gases are passed through the bed to heat the material to calcining temperature and effect the calcining thereof. Processes have heretofore been known in which limestone has been calcined on calcining machines. Generally, however, the limestone however finely crushed in such prior processes, has been relatively coarse so that gases may penetrate freely. In such prior processes it has also been proposed to arrange the differently sized pieces of limestone in strata with the coarser pieces in the upper layers of the bed, for a down-draft calcining, so that the more intense heat reacts first on these larger particles which, because of their size, require a longer time for complete calcining. Finely divided material, such as that of about 80 mesh or less cannot, however, be treated directly on a calcining machine in the same manner as described for relatively coarsely crushed limestone.

In my present invention, I provide a process whereby the above difficulties are overcome and whereby the first carbonates, whether above or below 80 mesh, are brought into a condition suitable for calcining on a calcining machine and are calcined without danger of overburning at those parts of the calcining bed which are subjected to the most intense heat.

The various features of the invention are illustrated in the accompanying drawing in which Fig. 1 is a vertical diagrammatic section through a calcining bed employing the process of my invention and showing the relative arrangement of different materials in the bed, and Fig. 2 is a flow sheet of the process.

In my invention the finely divided material, such as precipitated calcium carbonate, (a by-product of the Steffans sugar process), or refined natural marl, is first pelletized to form pellets of suitable size as, for example, those of about 4 to 8 mesh and then formed into an air permeable calcining layer and calcined, preferably with a down-draft, while protected with a cover or top dressing of coarse limestone, or other suitable heat absorbing material, between the pelletized layer and the source of the heat so as to protect the pelletized material from the most intense heat and thus prevent overburning.

In pelletizing the raw material in a suitably moistened condition it is broken up and rolled into small nodules or pellets, preferably of close size limit. Close sizing is desirable because, the larger the pellet, the longer is the time required for calcining, and uniformity of results would be more easily obtained with uniformity of pellet size.

The pelletizing can be accomplished in any suitable apparatus for this purpose. It is, for example, accomplished in a rotating horizontal cylinder fitted with a paddle shaft set slightly off center and which rotates in the opposite direction to the cylinder. The charge fed in at one end is carried in toward the paddles by the rotation of the cylinder and then thrown back on itself by the paddles while at the same time it is moistened by a fine spray of water. This beating and rolling action breaks up large lumps and gradually forms the charge into small pellets. By means of various adjustments and regulations known in the art, it is possible to deliver a pelletized product of sufficiently close sizing.

The proper moisture may be imparted to the original fine material according to its condition. For example, if it is too dry, it is moistened by water sprayed on to it in the pelletizer mixer by a fine spray nozzle; if too wet, it may be broken up and mixed with dry material before pelletizing. In certain cases it is only necessary to break up a wet cake of the material to suitable size and dust the fragments with dry powdered material to prevent them from reuniting. Pelletizing may, in short, be similar to that employed for pelletizing ores, cement mixtures, etc. for sintering.

When calcining the pelletized material of the above type as, for example, a precipitated calcium carbonate known as "pond lime", a layer of the pellets will be formed on the grate or pallets of the calcining machine for a suitable depth as, for example, about 5" deep. In order to prevent undue chilling of the lower layers of the pelletized material by contact with the pallets or grates of the sintering machine, it is preferably placed upon a relatively thin layer, for example, one half inch deep of relatively coarse particles, about 3/8" to 1/2" in size, of limestone, or similar material.

If the pelletized layer were subjected directly to the down blast of the hot gases and to the radiated heat from the furnace, the upper layers which would be subjected to the high temperatures for a longer period of time would be over-burned, that is they would be semi-fused, dense and of no value, as such material will not hydrate or react in a practicable time. Such overburning could be avoided by using low temperature gases, but the operation would then be so slow as to be impractical.

In my present invention, therefore, I cover the layer of pelletized material with a layer, for example, of about one half inch in thickness of coarse limestone, for example, 3/4" to 1/2" size. Such a layer laid on top of the pellets takes the direct heat of the gases, and being coarse will not over-burn as quickly as the finely precipitated carbonate or marl. Moreover, it is not material whether the coarse stone is over-burned or only partially burned since it is separated from the pellets after the calcining operation by screening and is then re-used.

In the cross section shown by way of example in Fig. 1, the intermediate layer 10 of pelletized fine material is laid on a layer of coarse particles and is covered by a top layer 12 of coarse particles of limestone. It will be understood that the hot gases, for example, at 1100° C., pass downwardly through the bed first striking the upper layer 12, and having its heat reduced or tempered or diffused, then passing through the layer 10 and downwardly through the layer 11. The layer 11 need not be brought to a high temperature but serves to insure that the lower part of the layer 10 shall be subjected to a calcining action and temperature for a sufficient period of time.

The flow sheet shown in Fig. 2 illustrates the sequence of operations of fines forming the starting period which are pelletized and fed between the coarse bottom dressing and the coarse top dressing and then calcined. After calcining the fines are separated from the top and bottom layers which are respectively returned for a subsequent operation.

*Example 1*

The material treated by my process is as follows:

Pond lime (precipitated by-product calcium carbonate) was pelletized to the following sizes:

|  | Per cent |
|---|---|
| Plus 3/8" | 3.8 |
| Minus 3/8" plus 4 mesh | 28.6 |
| Minus 4 plus 6 mesh | 47.6 |
| Minus 6 plus 8 mesh | 14.2 |
| Minus 8 plus 12 mesh | 3.0 |
| Minus 12 | 2.8 |
|  | 100.0 |

These pellets carried 31.7% moisture. They were charged on the pallets of the calciner in a layer 5" deep on top of a 1/2" deep layer of 3/8" to 1/2" limestone and covered by a 1/2" top dressing of the same size stone. Gases at 1100° C. to 1200° C. temperature were passed through the bed for a period of 20 minutes and the finished product was then screened to remove the coarse stone. All of the fine material was thoroughly calcined without overburning. In a test made without the coarse limestone top dressing, but with other conditions the same, a product resulted in which the top half of the three-quarter inch of the fine charge was so badly over-burned as to be useless.

*Example 2*

A natural lime marl, all finer than 100 mesh, was pelletized to the following size:

|  | Per cent |
|---|---|
| Plus 3/8" | 0.0 |
| Minus 3/8" plus 4 mesh | 2.4 |
| Minus 4 plus 6 mesh | 25.2 |
| Minus 6 plus 8 mesh | 33.7 |
| Minus 8 plus 12 mesh | 23.9 |
| Minus 12 | 14.8 |
|  | 100.0 |

These pellets contained 18.7% moisture. They were charged on the pallets in a bed 5" deep, as in the previous example, with an underlying 1/2" layer of 3/8" to 1/2" limestone and with a similar 1/2" layer on top. Gases at a temperature of 1100° C. were passed through the bed for 11 1/2 minutes, after which the product was screened to remove the coarse limestone particles. None of the pelletized material was over-burned, whereas in a similar test without the top dressing layer, the top quarter inch of pellets was over-burned.

Through the above invention therefore, I have provided a process in which very finely divided carbonates, such as precipitated calcium carbonate, lime marls, etc. may be rapidly calcined as on a calcining machine without substantial overburning. It will be obvious that while the invention has been described as applied to calcium carbonate, the material need not be pure calcium carbonate and that, as is common in this industry, it may be applied to carbonates of the other alkaline earths.

Various modifications may be made by those skilled in the art without departing from the invention as defined in the following claims.

What I claim is:

1. A method of calcining precipitated or finely divided calcium carbonate which comprises forming said carbonate into pellets for calcining and calcining a layer of said pellets while protecting the upper part of said layer with a covering layer of coarse material.

2. The method of calcining precipitated or finely divided calcium carbonate which comprises forming said carbonate into pellets of about 4 to 8 mesh and calcining said pellets in a layer while protecting the upper part of said layer with relatively coarse material.

3. The method of calcining precipitated or finely divided calcium carbonate which comprises forming said carbonate into pellets for calcining and calcining with a down-draft while protecting the upper part of said layer with a covering layer of coarse material.

4. The method of calcining precipitated or finely divided calcium carbonate which comprises forming said carbonate into pellets for calcining and calcining a layer of said pellets with a down-draft of gases heated to 1100° C. while protecting the upper part of said layer with a covering layer of coarse material.

5. The method of calcining precipitated or finely divided calcium carbonate which comprises forming said carbonate into pellets for calcining and calcining a layer of said pellets with a down-draft of gases heated to 1100° C. while protecting the upper part of said layer with a covering layer of calcium carbonate.

6. A method of calcining precipitated or finely divided calcium carbonate which comprises forming said carbonates into pellets for calcining and calcining the upper part of a layer of said pellets while protecting the upper part of said layer with a covering layer of coarse material, separating the pelletized fine material from the relatively coarser covering layer and returning the covering layer for a subsequent calcining.

7. A method of calcining precipitated or finely divided calcium carbonate which comprises forming said carbonates into pellets about 4 to 8 mesh, placing said pellets in a layer of about 5" of thickness on a supporting layer of relatively coarse carbonate, covering said layer with a relatively thin layer of coarse carbonate and heating said layer with a down-blast of gases of a temperature of about 1100° C. and thereafter separating the intermediate fine pelletized material from the coarse supporting and covering layers and returning the latter layers for subsequent calcining.

8. A method of calcining precipitated or finely divided calcium carbonate which comprises calcining successive quantities of pelletized precipitated or finely divided carbonate with a vertical draft of hot gases and protecting the pelletized layer at that surface thereof at which hot gases enter by covering said surface with a protecting material during calcining and subsequently separating said protective layer.

THORNE E. LLOYD.